E. E. GAMON.
STUFFING BOX FOR WATER METERS.
APPLICATION FILED JUNE 28, 1909.

954,621. Patented Apr. 12, 1910.

WITNESSES:

INVENTOR
Ernest E. Gamon
BY
Fischer & Sanders.
ATTORNEYS.

UNITED STATES PATENT OFFICE.

ERNEST E. GAMON, OF NEWARK, NEW JERSEY.

STUFFING-BOX FOR WATER-METERS.

954,621.  Specification of Letters Patent. Patented Apr. 12, 1910.

Application filed June 28, 1909. Serial No. 504,641.

*To all whom it may concern:*

Be it known that I, ERNEST E. GAMON, a citizen of the United States, residing in the city of Newark, county of Essex, and State of New Jersey, have invented certain new and useful Improvements in Stuffing-Boxes for Water-Meters, of which the following is a full, clear, and exact description, such as will enable others skilled in the art to which it pertains to make, construct, and use the same.

My invention relates to fluid meters, and it has for its object, to provide an improved construction to reduce the frictional resistance and leakage of the stuffing box, and whereby the several parts of such mechanism may be maintained in proper coöperative relation. With these ends in view, I have devised the means shown in the accompanying drawings, in which—

Figure 1:
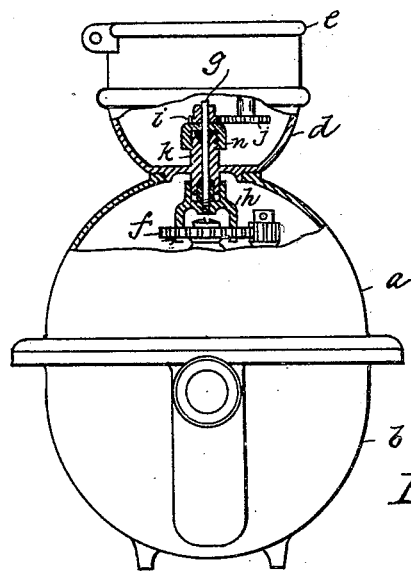
Figure 2:
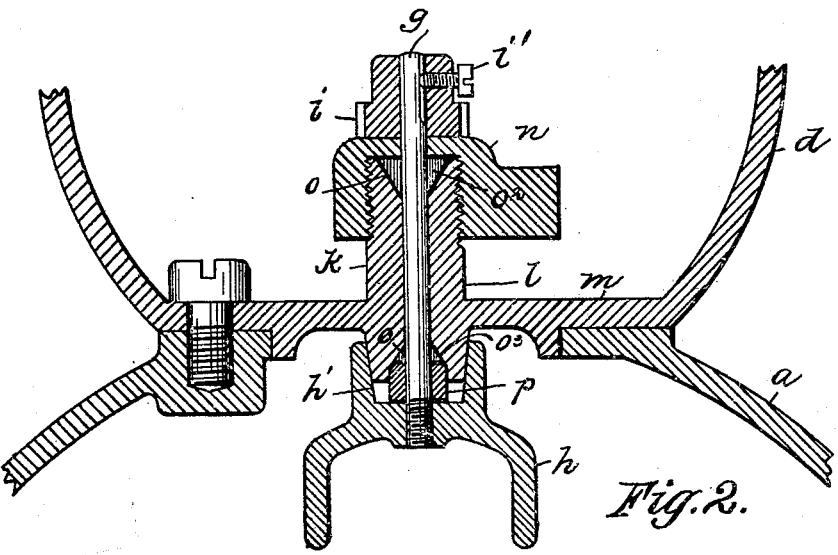

Figure 1 illustrates an external view of a water meter, partly in section, disclosing my improvements. Fig. 2 is an illustration of the device in vertical center-section.

Similar letters of reference refer to like parts throughout the specification and drawings.

The inclosing case of the meter is composed of the two shell-like castings $a$ and $b$, fastened together in any suitable manner. The upper casting $a$ has the register inclosing compartment $d$, secured thereto and is provided with the usual cover $e$. The registering mechanism and gear train may be of the usual type in common use in water meters, hence they are not here shown.

The casing $a$ of the meter is of a construction adapted to the contained parts of any desired character, and $f$ indicates one of a train of reducing gear or other part which derives motion from the operations of the meter. To this part $f$ is detachably connected by any suitable coupling, the spindle $g$. As shown, said spindle $g$ is secured in any convenient manner to the coupling $h$, and suitable gears $i$ and $j$ connect the spindle $g$ with the register train. The spindle $g$ passes through a stuffing box $k$. This stuffing box is composed of the tubular post $l$, cast integral with the compartment $d$ and extending above and below the partition $m$ of said compartment, the clamping nut $n$, and recesses $o$ and $o'$ formed in the upper and lower portions of the tubular post $l$, plastic packing material $o^2$, such as leather or cork or similar material in the recesses $o$, graphite or similar material $o^3$ in the recess $o'$, hard rubber bushing $p$ having one end contacting with the graphite packing and the other end contacting with the inside of the coupling $h$, the spindle $g$ being secured to the coupling $h$ and passing centrally through the hard rubber bushing $p$. The upper end of the spindle is secured to the gear wheel $i$ by means of a set screw $i'$. The clamping nut $n$ has screw-threaded engagement with the upper end of the tubular post $l$ of the stuffing box. The lower end of the tubular post $l$ of the stuffing box which projects below the partition $m$ of the casing $d$ is preferably slightly tapered to receive the tapered tubular bearing $h'$ of the coupling $h$.

Sometimes I find it convenient to make the upper end of the hard rubber bushing $p$ as shown in Fig. 2 of the drawings, beveled to conform to the bevel of the recess $o'$ formed in the lower end of the tubular post $l$, causing the end to press against the graphite packing located in the said recess, although I get equally good results with the bushing shown in Fig. 1, which is not beveled to conform to the bevel of the recess.

With the structures shown, it will be seen that the spindle is guided axially by the packings, hard rubber bushing and the tubular post; furthermore, that the water pressure exerted upon the coupling serves to crowd the hard rubber bushing against the graphite packing, and simultaneously, causes the tubular tapered bearing $h'$ to slide upon the tubular post $l$ of the stuffing box, thereby reducing the leakage of the stuffing box to a minimum and producing a non-leaking stuffing box.

I claim:

1. The combination with the casing of the register chamber of a meter providing a partition for separating the meter chamber and the register chamber, and provided with a stuffing box consisting of an upper post and a lower integral tapered post extending into said chambers respectively from said partition, of one of the driven parts of the meter provided with a tapered bearing arranged to surround the lower tapered post, a spindle passing through the said posts and connected with said driven part and packing parts located in the upper and lower posts and surrounding the spindle.

2. The combination with the casing of register chamber of a meter providing a partition for separating the meter chamber and the register chamber, and provided with a stuffing box consisting of an upper screw-threaded post and a lower conical post extending into said chambers respectively from said partition, of one of the driven parts of the meter provided with a tapered bearing arranged to surround the lower conical post, a register train, a spindle passing through the said posts and connected at its lower end with said driven part and at its upper end geared with the register train and packing parts located in the upper and lower posts and surrounding the spindle.

3. The combination with the casing of the register chamber of a meter providing a partition for separating the meter chamber and the register chamber, and provided with a stuffing box consisting of an upper screw-threaded post and a lower conical recessed post extending into said chambers respectively from said partition, of one of the driven parts of the meter in engagement with the lower conical post, a register train, a spindle passing through the said posts and connected at its lower end with said driven part and at its upper end geared with the register train and packing parts located in the said recesses of the upper and lower posts and surrounding the spindle.

4. The combination with the casing of the register chamber of a meter, providing a partition for separating the meter chamber and the register chamber and provided with a stuffing box consisting of an upper post and a lower tapered integral post extending into said chambers respectively from said partition, of one of the driven parts of the meter provided with a tapered bearing and in engagement with the lower post, a spindle passing through the said posts and connected with the driven part and packing located in the lower post surrounding the spindle and in engagement with the said driven part of the meter, whereby the internal pressure of the contents of the meter exerted against said driven part causes the packing to be forced into the post and around the spindle.

5. The combination with the casing of the register chamber of a meter providing a partition for separating the meter chamber and the register chamber, and provided with a stuffing box consisting of an upper screw-threaded post and a lower conical recessed post extending into said chambers respectively from said partition, of one of the driven parts of the meter in engagement with the lower conical post, a register train, a spindle passing through the said posts and connected at its lower end with said driven part and at its upper end geared with the register train and packing parts located in the said recesses of the upper and lower posts and surrounding the spindle, the packing in the lower post contacting with said driven part, whereby the internal pressure of the contents of the meter exerted against said driven part causes the packing to be forced into the recess and around the spindle.

This specification signed and witnessed this 25th day of June, 1909.

ERNEST E. GAMON.

Witnesses:
C. A. ALLISTON,
L. M. SANDERS.